US005089840A

United States Patent [19]

Sakamoto et al.

[11] Patent Number: 5,089,840

[45] Date of Patent: Feb. 18, 1992

[54] WATER SUPPLY SYSTEM FOR DEVELOPING APPARATUS

[75] Inventors: Kiichiro Sakamoto; Haruo Takase; Kazushige Uenaka, all of Kaisei; Junya Nakajima, Minami-Ashigara, all of Japan

[73] Assignee: Fuji Photo Film Co., Inc., Kanagawa, Japan

[21] Appl. No.: 513,138

[22] Filed: Apr. 24, 1990

Related U.S. Application Data

[63] Continuation-in-part of Ser. No. 318,441, Feb. 28, 1989, abandoned, which is a continuation of Ser. No. 37,672, Apr. 13, 1987, abandoned.

[30] Foreign Application Priority Data

Apr. 11, 1986 [JP] Japan ............................... 61-083934
Apr. 11, 1986 [JP] Japan ............................... 61-083935

[51] Int. Cl.[5] ............................................ F16K 31/02

[52] U.S. Cl. ...................................... 354/324; 137/93; 137/562

[58] Field of Search ..................... 137/560, 562, 599.1, 137/2, 4, 93; 354/297, 324; 138/114, 115; 285/119; 324/71.1

[56] References Cited

U.S. PATENT DOCUMENTS

| | | | |
|---|---|---|---|
| 3,733,994 | 5/1973 | Armstrong | 354/324 X |
| 4,081,816 | 3/1978 | Geyken et al. | 354/297 X |
| 4,086,937 | 5/1978 | Hechler, IV | 138/115 X |
| 4,160,512 | 7/1979 | Cleland | 137/599.1 X |
| 4,262,703 | 4/1981 | Moore et al. | 138/115 |
| 4,268,156 | 5/1981 | Kostiner | 354/324 |
| 4,273,146 | 6/1981 | Johnson | 137/93 X |
| 4,306,581 | 12/1981 | Alandt | 137/93 |
| 4,324,481 | 4/1982 | Becherer | 354/324 |
| 4,337,769 | 7/1982 | Escaron | 285/119 X |
| 4,486,060 | 12/1984 | Currall | 137/560 X |

FOREIGN PATENT DOCUMENTS

| | | | |
|---|---|---|---|
| 2571514 | 4/1986 | France | 354/324 |
| 62-239154 | 10/1987 | Japan . | |
| 62-239155 | 10/1987 | Japan . | |

*Primary Examiner*—John C. Fox
*Attorney, Agent, or Firm*—Sughrue, Mion, Zinn, Macpeak & Seas

[57] ABSTRACT

A rinsing water supply system for supplying water to a rinsing unit of a developing apparatus in which photosensitive materials are processed and rinsed. The water supply system includes a pipe having a water supply passage through which water is introduced into the rinsing unit from a water source, a solenoid valve for opening and closing the water supply passage, and signal lines arranged along and integrally with the pipe and adapted for transmitting signals for operating the solenoid valve. This arrangement eliminates the necessity for installation of a signal transmission line independently from the water supply passage, for the purpose of transmitting signals for operating the solenoid valve.

16 Claims, 12 Drawing Sheets

WATER SUPPLY SYSTEM FOR DEVELOPING APPARATUS

BACKGROUND OF THE INVENTION

1. Continuity

This is a continuation-in-part application Ser. No. 07/318,441 filed Feb. 28, 1989, now abandoned which is a continuation of U.S. patent application Ser. No. 07/037,672 filed Apr. 13, 1987, now abandoned.

The present invention relates to a water supply system for supplying water which is used for the purpose of rinsing photosensitive materials treated in developing apparatus.

In general, treatment of photographic films such as development of image or printing of image on print papers is followed by a rinsing step in which the film or the print paper is rinsed by water in a rinsing unit.

Usually, the system for supplying rinsing water to the rinsing unit is designed to replace the used rinsing water with fresh rinsing water at a constant rate or a rate which is determined in accordance with the frequency of use of the rinsing water.

The rinsing water supply system generally employs two pipes connected to the rinsing unit:namely, a water supply pipe through which fresh rinsing water is supplied to a treating tank in the rinsing unit and a draining pipe through which the used water is disposed of. The renewal of the rinsing water in the treating tank is conducted by opening and closing a valve in the water supply pipe as required.

The provision of such pipes, however, inevitably requires a large space for the installation of the rinsing unit and for the piping itself, thus restricting the place where the photographic film treating apparatus is to be situated.

In addition, the known rinsing water supply system does not enable the rate of supply of water to be controlled delicately and, therefore, is not suitable in such cases where the rinsing is to be conducted with a small quantity of rinsing water. Namely, a delicate control of the water supply rate requires, for example, a flow rate control solenoid valve disposed in the water supply pipe and electric wirings for connecting the solenoid valve to the rinsing control section. This is quite inconvenient in that troubles may be caused by wetting of the solenoid valve or the electric wiring by the rinsing water.

Another problem encountered by the conventional water supply system is that, when the used water is to be diluted for the purpose of disposal, it is necessary that the diluting water be charged into the rinsing unit, so that the amount of water in the rinsing unit is increased to cause various inconveniences.

SUMMARY OF THE INVENTION

Accordingly, an object of the present invention is to provide a rinsing water supply system for a developing apparatus which can eliminate the necessity for laying electric wirings around the wet rinsing unit.

Another object of the present invention is to provide a rinsing water supply system for a developing apparatus in which the space required for the piping arrangement is minimized while enabling the water supply rate to be controlled delicately.

Still another object of the present invention is to provide a water supply system for a developing apparatus which is improved such as to facilitate the work for diluting the used rinsing water to be disposed of.

To these ends, according to one aspect of the present invention, there is provided a rinsing water supply system for supplying rinsing water to a rinsing unit in which a photosensitive material is rinsed, comprising:

water supply passage means for supplying water from a water source to said rinsing unit;

solenoid valve means for opening and closing said water supply passage means; and signal transmitting means disposed along and integrally with said water supply means and adapted for transmitting signals for operating said solenoid valve means.

This eliminates the necessity for laying electric wiring for electric parts such as a solenoid valve independently from the piping, because signal transmitting means are arranged along the water supply conduit means integrally therewith.

In a specific form of the present invention, the signal transmitting means includes optical fiber cables, so that any problem which otherwise may be caused by the wetting of electric cables is eliminated.

In another specific form of the present invention, the efficiency of the work for diluting the used water to be disposed of is improved by virtue of the provision of a mixing dilution means in which a part of the water branched from the water supply line is mixed with the used rinsing water so as to dilute the used water to be disposed of.

The above and other objects, features and advantages of the present invention will become clear from the following description of the preferred embodiment when the same is read in conjunction with the accompanying drawings.

DESCRIPTION OF THE PREFERRED EMBODIMENTS

Figure 1:
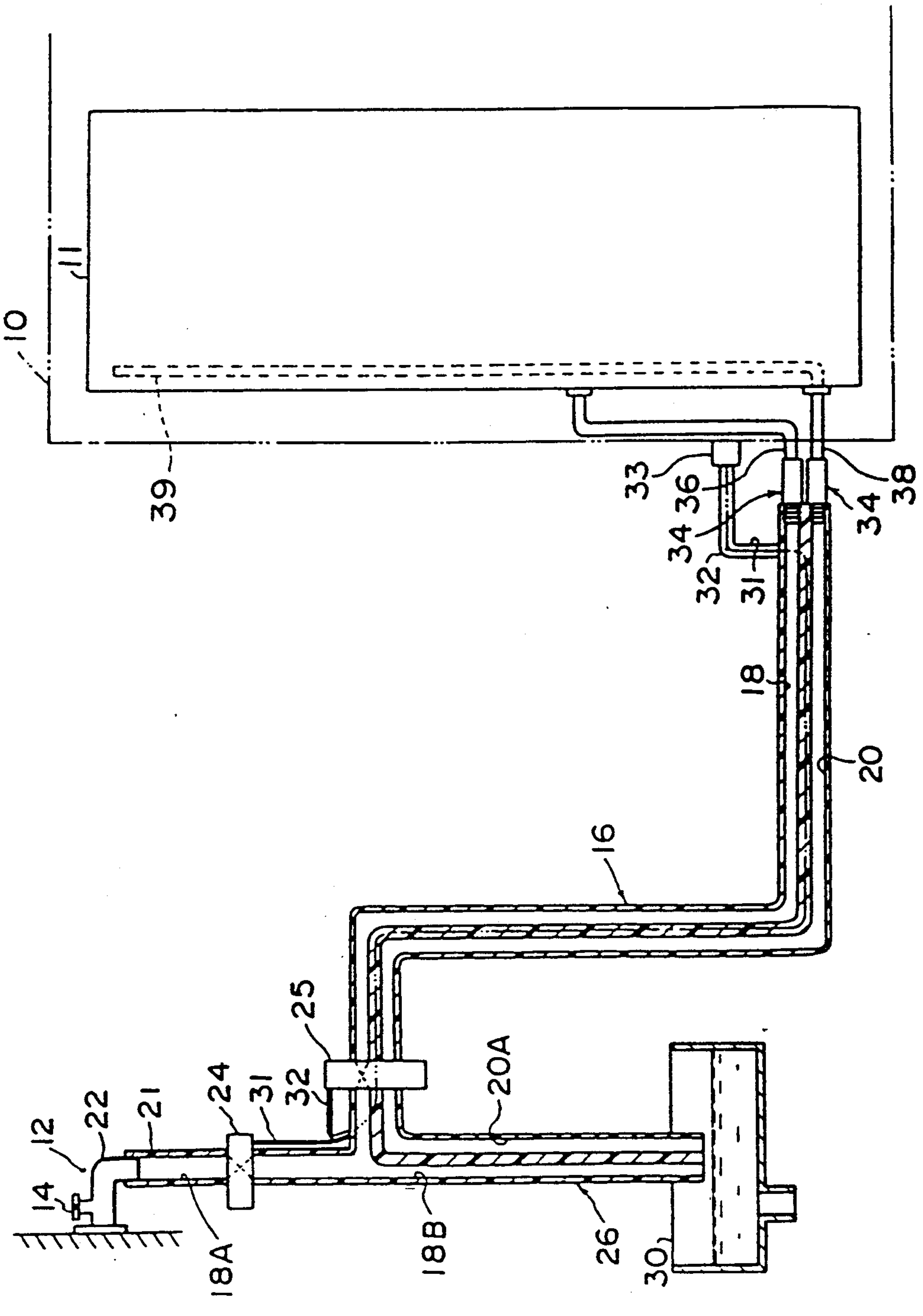
FIG. 1 is a schematic illustration of a first embodiment of the rinsing water supply system in accordance with the present invention.

Referring now to the drawings in greater detail, wherein like reference numerals indicate like parts throughout the several figures, the invention is illustrated as being incorporated in draining means used in a developing apparatus for photosensitive materials treatment.

First Embodiment:

FIG. 1 schematically shows a photographic film processing unit 1 generally referred to as a processor which incorporates a rinsing water supply system in accordance with the present invention.

This processor is designed to automatically perform a series of operations including printing, development, fixing and drying on photosensitive materials such as print papers (not shown). The processor 10 is provided with a rinsing unit 11 which is disposed downstream from a vessel for conducting bleaching and bleach-fixing after coloring development. A pipe 16 leading from a faucet 14 of service water source 12 to the rinsing unit 11 constitutes means through which rinsing water is supplied to the rinsing unit 11.

Figure 2:
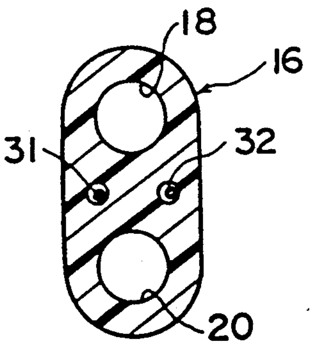
FIG. 2 is a cross-sectional view of a pipe taken along a plane perpendicular to the axis of the pipe.

More specifically, as will be seen from FIG. 2, the pipe 16 has a flattened form and is provided therein with a water supply passage 18 through which the rinsing water is supplied to the rinsing unit and a draining passage 20 through which the used water to be disposed of is discharged from the rinsing unit. These passages 18 and 20 extend through the entire length of the pipe 16 so as to open in both ends of the latter.

The pipe 16 is made of a soft rubber and, hence, is flexible, so that it can easily be laid to connect the rinsing unit 11 to the faucet 12. More specifically, the end of the pipe 16 remote from the rinsing unit 11 is branched into two pipes. One of these pipes is a pipe 21 having a circular cross-section and defining therein a single water passage bore 18A. The water passage bore 18A is communicated at its one end with the water supply passage 18 in the pipe 16 and connected at its other end with the cock 22 of the service water source 12 so as to supply the water to the rinsing unit 11 as desired. A first solenoid valve 24 is mounted in the portion of the pipe 21 adjacent to the cock 22. The first solenoid valve 24 operates to restrict and control the rate of supply of the water from the water passage bore 18A to the water supply passage 18 in the pipe 16. A second solenoid valve 25 is mounted in the pipe 16 at an intermediate portion of the water supply passage 18. This second solenoid valve 25 is adapted for cooperating with the first solenoid valve 24 in controlling and restricting the rate of supply of the rinsing water into the rinsing portion 11.

Another pipe 26 branching from the end of the pipe 16 has therein a water supply passage 18B and a draining passage 20A which extend in, parallel with each other. The water supply passage 18B communicates with the water supply passages 18A and 18. Similarly, the draining passage 20B is communicated with the draining passage 20 in the pipe 16. The water supply pipe 18A has a larger cross-sectional area than the water supply passage 18B so that, when both the solenoid valves 24 and 25 are opened, the water from the water supply passage 18A flows both into the water supply passages 18 and 18B.

The other ends of the water supply passage 18B and the draining passage 20A open into a butt 30, so that the used water from the rinsing unit 11 and the water which comes from the faucet 14 when the solenoid valve 24 is opened are introduced into the butt 30.

Namely, the butt 30 receives both the service water from the water supply passage 18A and the used water from the draining passage 20A, so that the used water is mixed with and diluted by the service water within the butt 30 before it is disposed of.

Electric lines 31 and 32 (see FIG. 2) as signal transmission means for activating the solenoid valves 24 and 25 are laid in the pipe 16. It is, therefore, possible to obtain means for supplying rinsing water to the rinsing unit 11, means for discharging used water from the rinsing unit 11 and means for controlling the solenoid valves 24, 25 by installing a single pipe 16.

The electric lines 31 and 32 are connected through a plug 33 to the driving circuit of a microcomputer (not shown) installed on the processor 10, so that the solenoid valves 24 and 25 are activated to open and close respective passages in accordance with the result of detection of conditions such as the state of transfer of the photosensitive material and the amount of water or extent of contamination of water in the rinsing unit 11.

Couplings 34 as a connecting means are provided on the end of the pipe 16 adjacent to the rinsing unit 11. The water supply passage 36 and the draining passage 20 in the pipe 16 are connected to a water supply port member 36 and a draining port member 38 which are projected from the rinsing unit 11.. Thus, the water supply passage 18 is connected to the water supply port member 36, while the draining passage 20 is connected to the draining port member 38. The discharge port member 38 is connected to a blow pipe 13 which extends upwardly within the rinsing unit 11 so that, when the water level in the rinsing unit 11 has exceeded the level of the upper end opening of the blow pipe 13, the surplus water is discharged through the blow pipe 13 and then through the draining passage.

Figure 3:
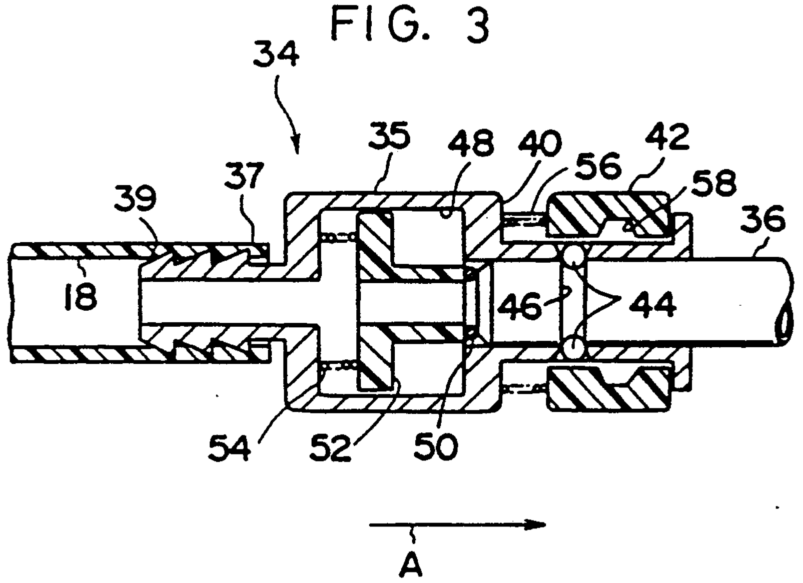
FIG. 3 is a sectional view of a coupling.
Figure 4:
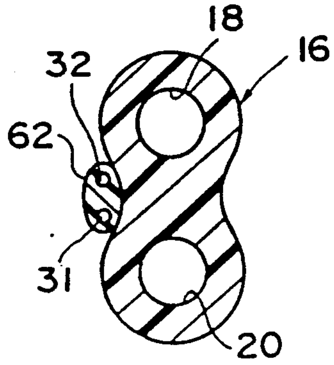
FIG. 4 is a sectional view of a structure composed of a pipe and a signal line cord, taken along a plane perpendicular to the axis of the pipe.

As will be seen from FIG. 3, the coupling 34 connected to the water supply port member 36 has a main part 35 which is provided with a connecting tube 37 projecting therefrom. The connecting tube 37 is provided with a serrated surface 39 and is press-fit into the water supply passage 18. The serration 39 on the surface of the connecting tube 37 permits the connecting tube to move deeper into the water supply passage 37 but resists any force which would act to withdraw the connecting tube from the water supply passage 18 by producing a large frictional resistance. The main part 35 of the coupling is provided with a recess 40 in the outer peripheral surface thereof and a release ring 42 is received in the recess for movement in the axial direction. The arrangement is such that the inner peripheral surface of the release ring 42 urges a ball 44 towards the water supply port member 36 so as to slide the same into an annular groove 46 formed in the outer peripheral surface of the water supply port member 36, thereby connecting the coupling 34 to the water supply port member 36.

The coupling main part 35 has an internal bore or cavity 48 which accommodates an ejector 52 which is biased by a compression coiled spring 54 in the direction of an arrow A shown in FIG. 3 into contact with the water supply port member 36 through an "O" ring 50, whereby the water supply passage 18 is communicated with the opening of the water supply port member 36 without allowing water to leak to the outside. A compression coiled spring 56 disposed in the recess between the release ring 42 and the coupling main body 35 serves to urge the release ring 42 in the direction of the arrow A. The release ring 42 is provided with a cam groove 58 formed in a part of the inner peripheral surface thereof. The arrangement is such that, when the release ring 42 is moved in the direction opposite to the arrow A against the force of the compression coiled spring 56, the cam groove 58 is aligned with the ball 44 so as to permit the ball 44 to escape from the groove 46, thus uncoupling the pipe 16 from the water supply port member 36. The construction of the coupling 34 provided on the draining passage 20 is the same as that for the water supply passage 18, so that detailed description thereof is omitted.

The operation of the first embodiment will be explained hereinunder. The way of assembly of the rinsing water supply system, particularly the way of installing the pipe 16, will be explained first. As the first step, the end of the pipe 21 having the circular cross-section is connected to the faucet 22 of the service water source 12 so that the water supply passage 18A is connected to the valve 14. Then, the distal end of the branch pipe 26 is opened to the butt 30 and the pipe 16 is connected to the rinsing unit 11 through the coupling 34. This work can be conducted without difficulty and the pipe 16 does not require large installation space because the pipe 16 is made of a soft rubber. The connection of the pipe 16 to the rinsing unit 11 is conducted by fitting the coupling main part 35 onto the water supply port member 36 while urging the release ring 42 of the coupling 34 on the end of the water supply passage 18 in the direction opposite to the arrow A in FIG. 3 against the biasing force of the compression spring 56. After fitting the coupling main part onto the member 36, the release ring 42 is released so that the release ring 42 moves in the direction of the arrow by the biasing force of the compression coiled spring 56, so that the ball 44 is received in the groove 46 formed in the water supply port member 36, thus completing the connection. The connection of the draining passage 20 to the draining port member 38 can be conducted by the same way.

As the first solenoid valve 24 is opened, a part of the service water from the cock 22 is introduced into the butt 30 through the water supply passage 18B in the branch pipe 26. This water is utilized as the diluting water which is mixed with the used water which is introduced into the butt 30 through the draining passage 20 so as to dilute the used water within the butt 30.

The diluted water is then drained from the butt 30. It will be understood that the efficiency of the work for diluting the used water is improved because there is no need for dilution of used water within the rinsing unit 11.

Then, as the second solenoid valve 25 is opened, the water supply passage 18 is brought into communication with the cock 22 so that water is supplied also into the rinsing unit 11 through the water supply passage 18 and the water supply port member 36.

The electric lines 31 and 32 for the electric power supply to the solenoid valves 24 and 25 are extended through the pipe 16 and connected to the microcomputer in the rinsing unit 11, so that these electric lines can be laid and connected independently through, for example, plugs at the time of installation of the pipe 16.

The microcomputer controls the states of the solenoid valves 24 and 25 upon detection of the conditions such as the amount of and the extent of contamination of the water in the rinsing unit 11, thus ensuring adequate water supply to the rinsing unit 11.

Although in the described embodiment the water supply passage 18 and the draining passage 20 are connected to the rinsing unit through independent couplings 34, 34, this is not exclusive and the connection of the water supply passage 18 and the draining passage 20 to the water supply port member 36 and the draining port member 38 may be conducted simultaneously through a dual coupling.

In the described embodiment, the electric lines 31 and 32 are embedded in the pipe 16 at the time of molding of the pipe 16. This is only illustrative and the electric lines in the form of an integral signal line cord 62 is fixed to the outer peripheral surface of the pipe 16 by, for example, bonding, before the pipe 16 is installed.

It is to be noted also that the solenoid valve 24, which is mounted in the water supply passage 18A so as to open and close the latter in the described embodiment, may be installed on the branch pipe 26 so as to be able to open and close the water supply line 18B.

Figure 5:
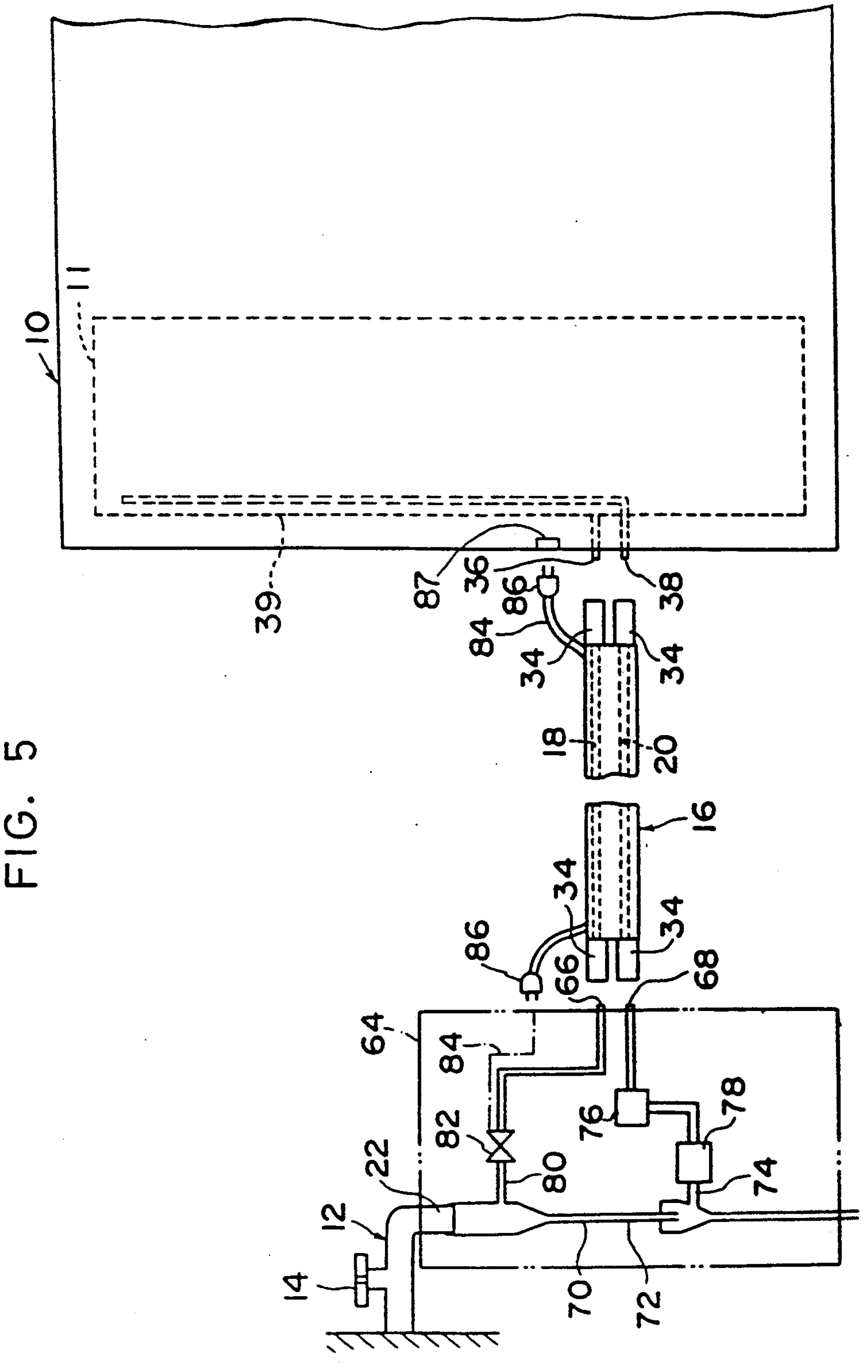
FIG. 5 is a schematic illustration of a second embodiment of the present invention in which draining means is constructed as a unit and is connected to a processor.

Second Embodiment:

FIG. 5 shows a second embodiment of the present invention. In this Figure, the same reference numerals are used to denote the same parts or members as those used in the first embodiment. This second embodiment is characterized in that the pipe 16 is connected between the water supply port member 36 and the draining port member 38 of the rinsing unit 11 and outlet 66 and inlet 68 of a water supply/draining unit 64.

In this embodiment, the pipe 16 has a water supply passage 18 and a draining passage 20 which are extended in parallel with each other, and is connected at its one end to the water supply/draining unit 64 through couplings 34 and at its other end to the rinsing unit 11 also through couplings 34.

The water supply/draining unit 64 includes a vertical pipe 70 which is connected at its upper end to the cock 22 of the service water source 12. The pipe 70 is provided at its intermediate portion with a structure which is generally known as "ejector". More specifically, an intermediate portion of the pipe 70 has a reduced diameter as at 72 where the flowing velocity of water is increased so as to generate a reduced pressure which acts to induce the used water through an induction port 74. The thus induced water is diluted by the water from the cock 22 and then disposed of. The connection between the induction port 74 and the inlet 68 is provided with a filter 76 having a filtration element made of steel wool, and a check valve 78. The steel wool filter 76 filters the used water before it reaches the induction port 74. The check valve 78 effectively prevents the used water from reversing of the flow of the used water which may be caused in the event that the flow velocity of the diluting water from the service water line is decreased.

A solenoid valve 82 is provided in an intermediate portion of the pipe 80 which is connected between the pipe 70 and the outlet 66, and the electric signal line 84 for energizing the solenoid valve 82 is connected to a microcomputer which is not shown. The microcomputer is adapted to energize the solenoid valve 82 in accordance with the speed of transfer of the photosensitive material. More specifically, a sensor (not shown) senses arrival of the leading end of the photosensitive material at the inlet of the rinsing unit 11. Upon receipt of the output from the sensor, the microcomputer operates to open the solenoid valve 82. The microcomputer then operates to close the solenoid valve 82 as it receives from the sensor a signal representing that the trailing end of the photosensitive material has passed the inlet.

The water supply/draining unit 64 and the rinsing unit 11 may be directly connected to each other such that the outlet 66 and the inlet 68 are communicated with the water supply port member 36 and the water draining port member 38, respectively, if the unit 64 can be installed in the vicinity of the rinsing unit 11. However, when the unit 64 is installed at a place remote from the rinsing unit 11, it is connected to the rinsing unit 11 through the flat pipe 16 having the water supply passage 18 and the water draining passage 20. This can be accomplished without difficulty by connecting one end of the pipe 16 to the outlet 66 and the inlet 68 of the water supply/draining unit 64 through respective couplings 34, while connecting the other end of the pipe 16 to the water supply port member 36 and the draining port member 38 of the rinsing unit 11 through similar couplings 34, thus attaining communication between the outlet 66 and the water supply port member 36 and between the inlet 68 and the water draining port 38, respectively.

In this embodiment also, an electric line 84 is embedded in the pipe 16 so that it can easily be connected to the water supply/draining unit 64 and the processor 10 by inserting plugs 86 on both ends of the electric line 84 into one receptacle 87 of the processor 10, and the other receptacle (not shown) of the water supply/draining unit 64, respectively.

The operation of the second embodiment is as follows.

As the service water is supplied from the service water source 12, a reduced static pressure is produced in the small-diameter portion 72 of the pipe 70 so that used water is induced from the induction port 74, whereby the used water is diluted by the water from the service water source 12. Since the rate of induction of the used water is proportional to the flow velocity of the water from the service water source, the ratio of mixing of the water from the service water source and the used water is always maintained constant regardless of any change in the rate of supply of the water from the service water source, thus eliminating any adjustment of the flow rate of the diluting water in accordance with the amount of used water to be disposed of. This in turn enables the consumption of the diluting water to be minimized, contributing to a reduction in the running cost of the system.

Although in the illustrated embodiment the diluting water is directly supplied as the valve 14 of the service water source is opened, the arrangement may be such that the supply of the diluting water is controlled by a solenoid valve mounted on the outlet of the cock 22.

Third Embodiment:

A third embodiment of the present invention will be described with reference to FIG. 6 in which the same reference numerals are used to denote the same parts or members as those used in the first embodiment, and detailed description of such parts or members is omitted.

Figure 6:
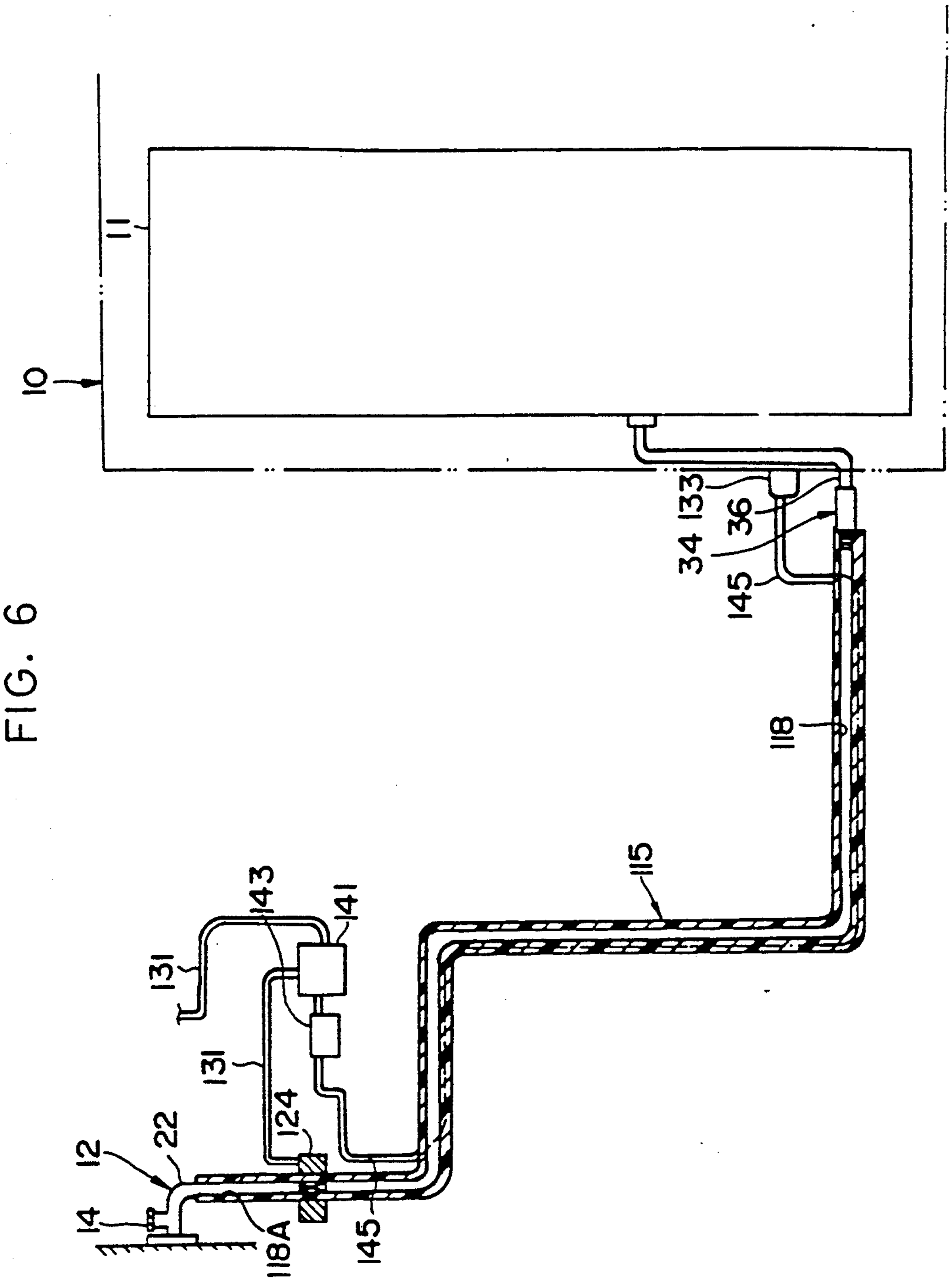
FIG. 6 is a schematic illustration of a third embodiment of the rinsing water supply system in accordance with the present invention.
Figure 7:
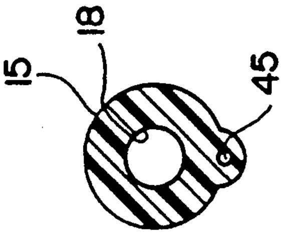
FIG. 7 is a sectional view of a pipe incorporated in the third embodiment taken along a plane perpendicular to the axis of the pipe.

As will be seen from FIG. 6, the third embodiment has a pipe 115 which constitutes a communication pipe between the valve 14 of the service water source 12 and the rinsing unit 11. As shown in FIG. 7, the pipe 115 is provided therein with a water supply passage 118 through which the water is supplied to the rinsing unit 11. The water supply passage 118 extends over the entire length of the pipe 115 so as to open in both ends of the latter. The pipe 115 is made of a soft rubber and, hence, is highly flexible, so that the work for laying the pipe 115 between the service water source 112 and the rinsing unit 11 is facilitated.

The pipe 112 is connected at its one end to the cock 22 of the service water source 12 so as to supply the water to the rinsing unit 11. A solenoid valve 124 installed in the portion of the pipe 115 near the cock 22 regulates or controls the rate of flow of the water from a water supply passage 118A to the water supply passage 118. The electric line 131 for operating the solenoid valve 124 is connected through a relay circuit 141 to an electric power supply (not shown). This electric line 131 is spaced apart from wet portions, i.e., the rinsing unit 11 and the pipe 115, except for the portion where it is connected to the solenoid valve 124.

A photosensor 143 is connected at its output end to the relay circuit 141. A switch in the relay circuit 141 is adapted to be turned on by a signal from the photosensor 143 so as to allow the supply of electric power to the solenoid valve 124. The photosensor 143 is an element such as a phototransistor which generates, in response to a light signal, a photoelectric current by which the relay circuit 141 is operated.

An optical cable 145 (see FIG. 7) also is embedded in the pipe 115. The optical fiber cable 145 constitutes a signal transmission means for transmitting light signal to the photosensor 143. It is, therefore, possible to accomplish the means for supplying water to the rinsing unit 11 and the means for controlling the solenoid valve 124 by installing a single pipe 115.

The optical fiber cable 145 is connected through a plug 133 to the driver circuit of a microcomputer (not shown) mounted in the processor 10. The driver circuit transmits a light signal to the photosensor 143 through the optical fiber cable 145 as required, in accordance with the result of detection of conditions such as the amount of water or degree of contamination of water in the rinsing unit 11. The relay circuit 141 is then operated in response to the output from the photosensor 143 so as to open and close the solenoid valve 124.

Thus, in this third embodiment, the communication between the rinsing unit 11 and the solenoid valve 124 is conducted by means of a photosignal.

The pipe 115 is provided at its end adjacent to the rinsing unit 11 with a coupling 34 as connecting means. The water supply passage 118 in the pipe 115 is connected through this coupling 34 to the water supply port member 36 projecting from the water rinsing unit 11 so that it is communicated with the interior of the rinsing unit through the water supply port in the member 36. The construction and operation of the coupling 34 are not described here because they are materially the same as that in the first embodiment explained in connection with FIG. 3.

The operation of the third embodiment is as follows. For the assembly of the rinsing system, the pipe 115 is connected at its end remote from the rinsing unit 11 to the cock 22 of the service water source 12 so that the water supply passage 118A is communicated with the valve 14 of the service water source. Since the solenoid valve 124 is connected to a portion near the valve 14, the water pressure applied to the portion of the water passage downstream from the solenoid valve 124 is not so high, so that the pipe 115 connected between the solenoid valve 124 and the rinsing unit 11 may be made of a soft rubber. This appreciably facilitates the work for laying the pipe thanks to the flexibility of the pipe 115.

The connection of the pipe 115 to the rinsing unit 11 is accomplished by fitting the coupling main part 35 onto the water supply port member 36 while urging the release ring 42 of the coupling 34 on the end of the water supply passage 118 in the direction opposite to the arrow A in FIG. 3 against the biasing force of the compression spring 56. After fitting the coupling main part onto the member 36, the release ring 42 is released so that the release ring 42 moves in the direction of the arrow by the biasing force of the compression coiled spring 56, so that the ball 44 is received in the groove 46 formed in the water supply port member 36, thus completing the connection.

As the solenoid valve 124 is opened, the water from the cock 22 of the service water line is introduced into the water supply passage 118 and is supplied into the rinsing unit 11 through the water supply port member 36. Since the electric line 131 leading to the solenoid valve 124 is laid through an area sufficiently remote from the wet portions such as the rinsing unit 11 and the pipe 15, the installation of the electric line 131 can be conducted easily without necessitating any specific measure for preventing leak of electric current.

The optical fiber cable 145 for transmitting a light signal to the optical sensor 143 for activating the relay circuit 141 is extended through the pipe 115 so as to be connected to the driver circuit of the microcomputer of the rinsing unit. The connection of the optical fiber cable 145 can be accomplished through, for example, plugs 133 simultaneously with the installation of the pipe 115.

The microcomputer transmits to the photosensor 143 a light signal representing the conditions such as the state of transfer of the photosensitive material and the amount and the degree of contamination of the water in the rinsing unit 11 periodically or each time any faulty condition is detected. Upon receipt of the light signal, the photosensor 143 turns on the switch in the relay circuit 141, thereby allowing the electric power to be supplied to the solenoid valve 124. Thus, an adequate supply of water to the rinsing unit 11 is conducted by virtue of the microcomputer which observes the state of water in the rinsing unit 11.

Figure 8:
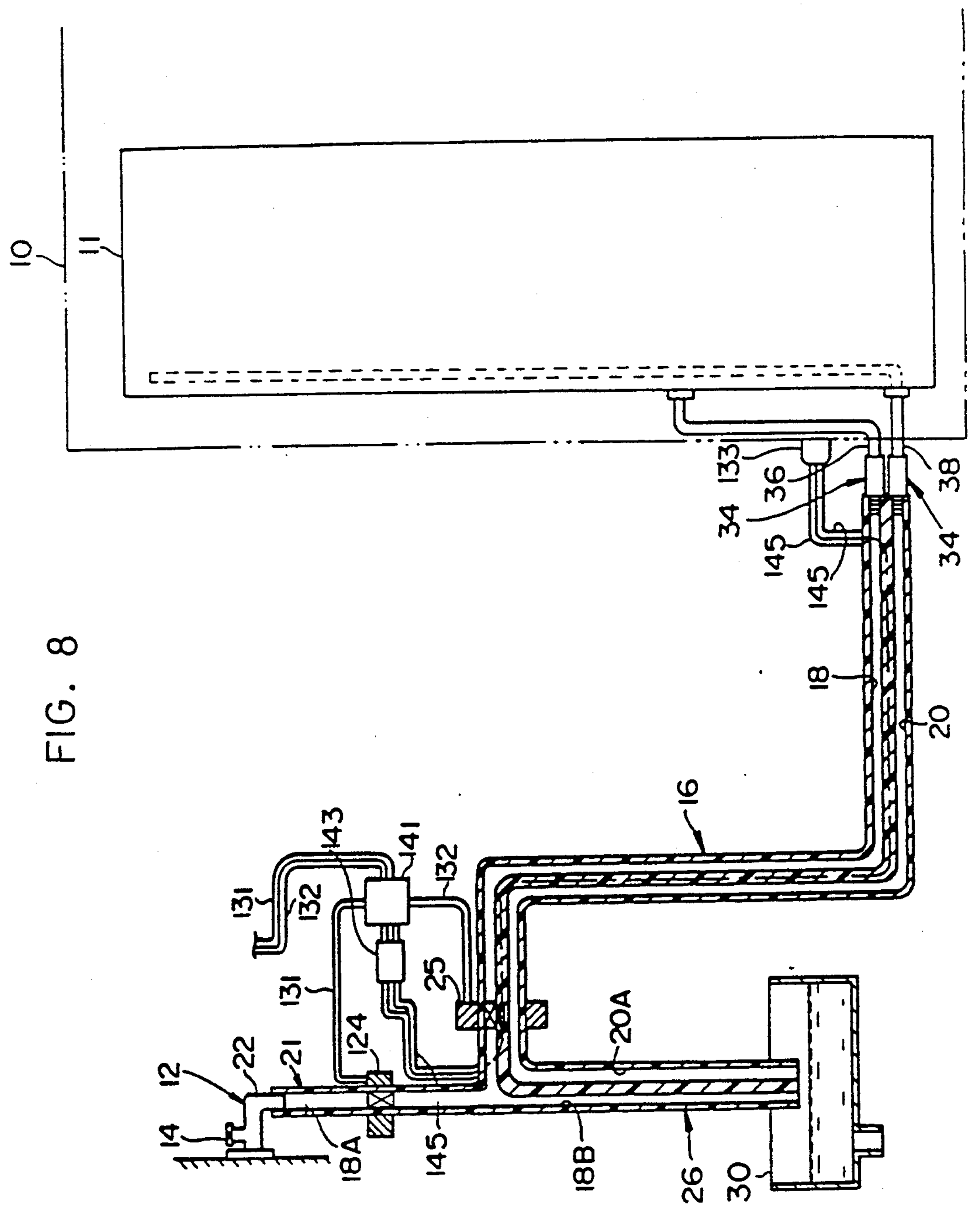
FIG. 8 is a sectional view of a pipe incorporated in the fourth embodiment taken along a plane perpendicular to the axis of the pipe.

Fourth Embodiment:

FIG. 8 shows a photo-film processing apparatus 10 known as processor incorporating a rinsing water supply system in accordance with a fourth embodiment of the present invention. The rinsing water supply system of the fourth embodiment features that the optical fiber cable 145 used in the third embodiment is applied to an arrangement which is basically the same as the first embodiment. Thus, in FIG. 8, the same reference numerals are used to denote the same parts or members as those in the first and the third embodiments, and detailed description of such parts or members is omitted. The shape and the material of the pipe 16, as well as the piping arrangement including the pipe 16, pipe 21, branch pipe 26 and so forth, are materially the same as those in the first embodiment.

Electric lines 131 and 132 for operating the solenoid valves 124 and 125 are connected to an electric power supply (not shown) through a relay circuit 141. These electric lines 131 and 132 are laid through areas sufficiently remote from the wet portions such as the rinsing unit 11 and the pipe 16 except for the portions where they are connected to the solenoid valves 124 and 125.

The relay circuit 141 has a switch which is adapted to be turned on in response to an output from a photosensor 143 connected to the relay circuit 141, thereby allowing the electric power to be supplied to the solenoid valves 124 and 125. The photosensor 143 is an element such as a phototransistor capable of producing photoelectric current upon receipt of a light signal. The switch in the relay circuit 141 is operated by this photoelectric current.

An optical fiber cable 145 for transmitting a light signal to the photosensor 143 is embedded in the pipe 16. It is, therefore, possible to complete means for supplying and discharging water to and from the rinsing unit 11 and means for controlling the solenoid valves 124 and 125, by laying a single pipe 16.

The optical fiber cable 145 is connected through a plug 133 to the driver circuit of a microcomputer (not shown) installed on the processor 10. The driver circuit detects the conditions such as the state of transfer of photosensitive material and the amount and degree of contamination of the water in the rinsing unit, and transmits as required a light signal to the photosensor 143 through the optical fiber cable 145. The photosensor 143 then activates the relay circuit 141 so as to operate the solenoid valves 124 and 125. The coupling 34 is of the same type as that used in the first embodiment, so that detailed description thereof is omitted.

The operation of the fourth embodiment will be described hereinunder.

The way of assembly of the rinsing water supply system, particularly the way of installing the pipe 16, will be explained first. As the first step, the end of the pipe 21 having the circular cross-section is connected to the faucet 22 of the service water source 12 so that the water supply passage 18A is connected to the valve 14. Then, the distal end of the branch pipe 26 is opened to the butt 30 and the pipe 16 is connected to the rinsing unit 11 through the coupling 34. This work can be conducted without difficulty and the pipe 16 does not require large installation space because the pipe 16 is made of a soft rubber. The connection of the pipe 16 to the rinsing unit 11 is conducted by fitting the coupling main part 35 onto the water supply port member 36 while urging the release ring 42 of the coupling 34 on the end of the water supply passage 18 in the direction opposite to the arrow A in FIG. 3 showing the first embodiment against the biasing force of the compression spring 56. After fitting the coupling main part onto the member 36, the release ring 42 is released so that the release ring 42 moves in the direction of the arrow by the biasing force of the compression coiled spring 56, so that the ball 44 is received in the groove 46 formed in the water supply port member 36, thus completing the connection. The connection of the draining passage 20 to the draining port member 38 can be conducted by the same way.

As the first solenoid valve 24 is opened, a part of the service water from the cock 22 is introduced into the butt 30 through the water supply passage 18B in the branch pipe 26. This water is utilized as the diluting water which is mixed with the used water which is introduced into the butt 30 through the draining passage 20 so as to dilute the used water within the butt 30.

The diluted water is then drained from the butt 30. It will be understood that the efficiency of the work for diluting the used water is improved because there is no need for dilution of used water within the rinsing unit 11.

Then, as the second solenoid valve 25 is opened, the water supply passage 18 is brought into communication with the cock 22 so that water is supplied also into the rinsing unit 11 through the water supply passage 18 and the water supply port member 36.

Since the electric line 131 leading to the solenoid valve 124 is laid through an area sufficiently remote from the wet portions such as the rinsing unit 11 and the pipe 15, the installation of the electric line 131 can be conducted easily without necessitating any specific measure for preventing leak of electric current.

Upon detection of the amount of water and degree of contamination of water in the rinsing unit 11, the microcomputer transmits a light signal to the photosensor 143 periodically or each time any faulty condition is detected. The photosensor 143 operates in response to the light signal so as to turn on the switch in the relay circuit 141, thus allowing supply of power to the solenoid valves 124 and 125. It will be understood that adequate water supply to the rinsing unit 11 is always ensured by virtue of the continuous observation of the state of water in the rinsing unit 11.

In the described embodiment, a pair of optical fiber cables 145 are connected to the pipe 16 so as to transmit the signals for operating the solenoid valves 124 and 125 independently. This, however, is not exclusive and the arrangement may be such that light signals of different wavelengths for operating different solenoid valves are transmitted through a single optical fiber cable. It is also possible to construct the optical fiber cables 145 as a single signal line cord 62 which is fixed to the outer peripheral surface of the pipe 16 by, for example, bonding, although in the described embodiment the optical fiber cables 145 are embedded in the pipe 16 simultaneously with the molding of the pipe 16.

Figure 9:
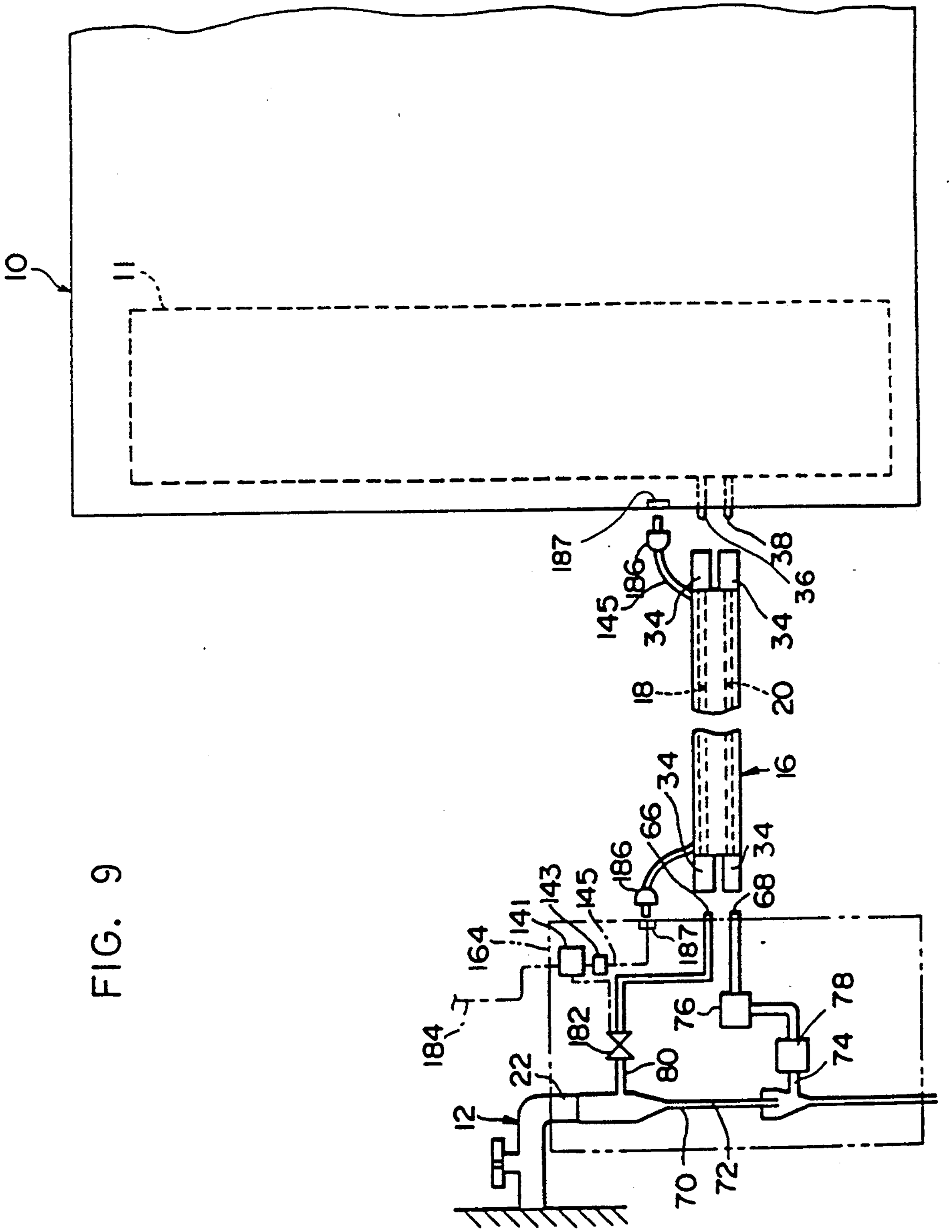
FIG. 9 is a schematic illustration of a fifth embodiment of the present invention in which draining means is constructed as a unit and is connected to a processor.
Figure 10:
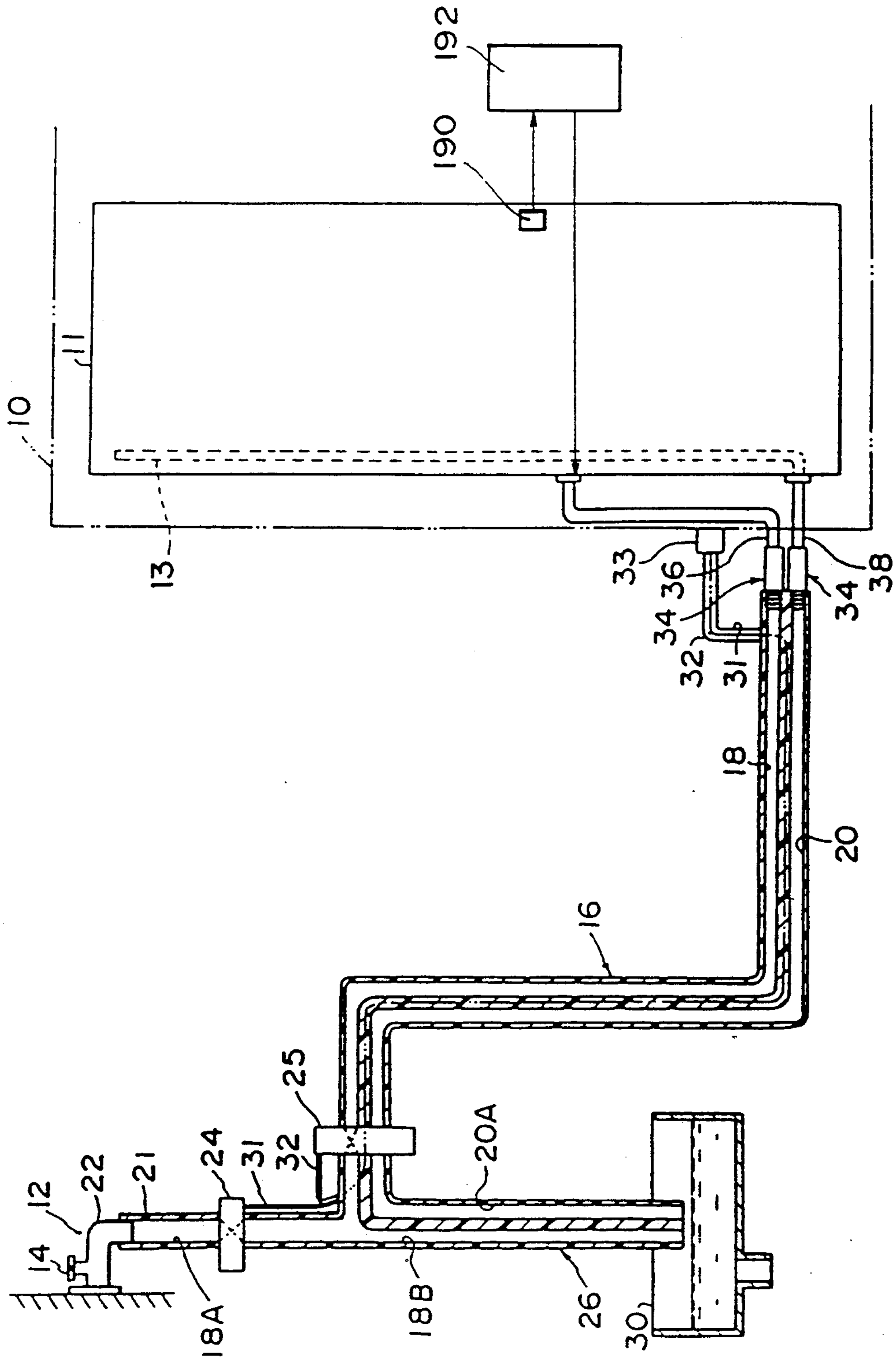
FIG. 10 is a schematic illustration of a sixth embodiment of the rinsing water supplying system which includes a rinsing water contamination detecting apparatus.

Fifth Embodiment:

FIG. 9 shows a fifth embodiment of the present invention in which the pipe 16 is connected between the outlet 66 and the inlet 68 of a water supply/draining unit 64 and the water supply port member 36 and the water draining port member 38 of the rinsing unit 11. The fourth embodiment features the combination between the basic arrangement which is substantially the same as the second embodiment and the optical fiber cable 145 used in the third embodiment. In FIG. 9, therefore, the same reference numerals are used to denote the same parts or members as those used in the second and the third embodiments, and detailed description of such parts or members is omitted. The shape and the material of the pipe 16, as well as the arrangement of pipes such as the internal piping of the water supply/draining unit 164, connection between the unit 164 and the pipe 16 and connection between the pipe 6 and the water supply port member 36 and the water draining port member 38 of the rinsing unit, are the same as those in the second embodiment.

A solenoid valve 82 is mounted in an intermediate portion of the pipe 80 between the pipe 70 and the outlet 66. The driving electric line 184 is connected to an electric power supply through a relay circuit 141 to which also is connected the output terminal of a photosensor 143. The solenoid valve 182 is controlled by a microcomputer in accordance with the state of transfer of the photosensitive material. More specifically, a sensor 188 senses the arrival of the leading end of the photosensitive material at the inlet of the rinsing unit 11. Upon sensing the arrival, the sensor sends a signal to the microcomputer which in turn operates to open the solenoid valve 182. When the trailing end of the photosensitive material has passed the inlet, the sensor delivers a signal to the microcomputer thereby to close the solenoid valve 182

The photosensor 143 is connected to the microcomputer through an optical fiber cable 145. The optical fiber cable 145 is embedded in the pipe 16. After connecting the pipe 16 to the rinsing unit 11, plugs 186 provided on both ends of the optical fiber cable 145 are inserted into receptacles 187 provided on the water supply/draining unit 164 and the processor 10.

The operation of the fifth embodiment is as follows.

As the service water is supplied from the service water source 12, a reduced static pressure is produced in the small-diameter portion 72 of the pipe 70 so that used water is induced from the induction port 74, whereby the used water is diluted by the water from the service water source 12. Since the rate of induction of the used water is proportional to the flow velocity of the water from the service water source, the ratio of mixing of the water from the service water source and the used water is always maintained constant regardless of any change in the rate of supply of the water from the service water source, thus eliminating any adjustment of the flow rate of the diluting water in accordance with the amount of used water to be disposed of. This in turn enables the consumption of the diluting water to be minimized, contributing to a reduction in the running cost of the system.

In FIGS. 10 to 14, additional embodiments, being, respectively, a seventh to tenth embodiment, are shown. These embodiments each comprise a rinsing water contamination detecting apparatus. The sixth embodiment in FIG. 10 relates to the first embodiment shown in FIG. 1. The seventh embodiment in FIG. 11 relates to the second embodiment shown in FIG. 5. The eighth embodiment in FIG. 12 relates to the third embodiment shown in FIG. 6. The ninth embodiment in FIG. 13 relates to the fourth embodiment shown in FIG. 8. And the tenth embodiment in FIG. 14 relates to the fifth embodiment shown in FIG. 9.

In the embodiments in FIGS. 10 to 14, the rinsing water contamination detecting apparatus is comprised of a detector 190 and a microcomputer 192. Either an electric resistance meter or a pH meter can be used as the detector 190 to detect the degree or level of the contamination of the used rinsing water in the rinsing unit 11.

The degree of the contamination of the rinsing water directly relates to the degree of concentration of inorganic chemical compounds in the rinsing water, and the degree of concentration of inorganic chemical compounds in the rinsing water can be determined by measuring the amount of electric conduction in the rinsing water or by measuring changes in the pH of the rinsing water.

The electrical resistance meter continuously measures the amount of the electrical conduction in the rinsing water in the rinsing unit 11, and the value so detected, representing the degree of contamination of the rinsing water is input into the microcomputer 192.

The pH meter continuously measures the pH of the rinsing water in the processing unit 11, and the value so detected, representing the degree of contamination of the rinsing water, is input into the microcomputer 192.

In cases where the rinsing water is alkali, when the rinsing water becomes contaminated, the rinsing water becomes more alkali, and the pH of the rinsing water therefore becomes higher. On the other hand, in cases where the rinsing water is acid, when the rinsing water becomes contaminated, the rinsing water becomes more acid, and the pH of the rinsing water therefore becomes lower.

When the value of the degree of contamination of the rinsing water in the processing unit 11 as detected by the detecting apparatus 190 exceeds a predetermined value stored in the microcomputer 192, a signal from the microcomputer 192 is sent to the water supply-draining unit causing it to operate so as to dilute the contaminated rinsing water in the processing unit 11.

When the value of the degree of contamination of the rinsing water in the processing unit 11 as detected by the detecting apparatus 190 becomes less than a predetermined value stored in the microcomputer 192, a signal from the microcomputer 192 is sent to the water supply/draining unit causing it to stop diluting the contaminated rinsing water in the processing unit 11.

Figure 11:
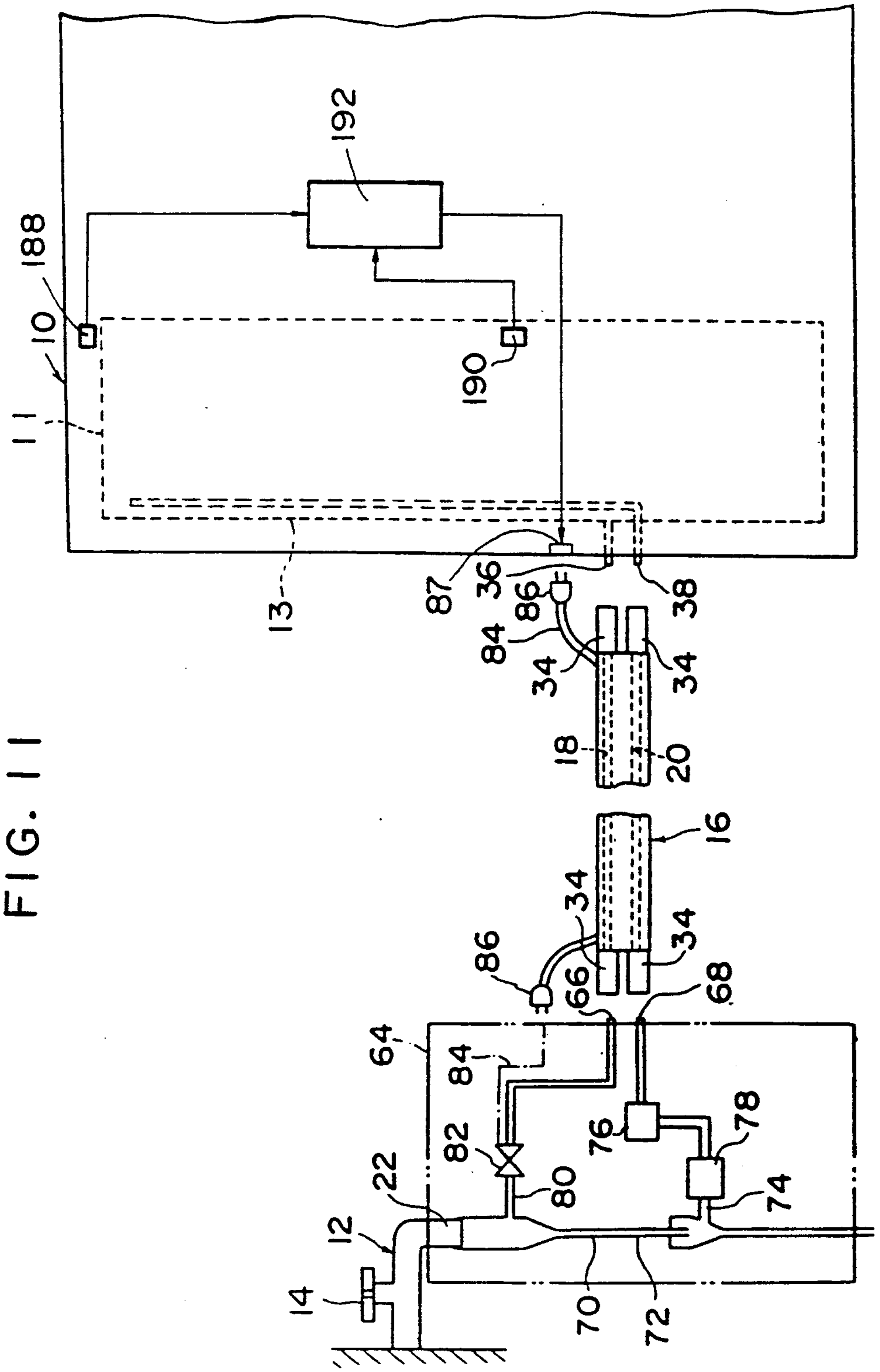
FIG. 11 is a sectional view of a pipe incorporated in the seventh embodiment taken along a plane perpendicular to the axis of the pipe, the embodiment includes a rinsing water contamination detecting apparatus.
Figure 12:
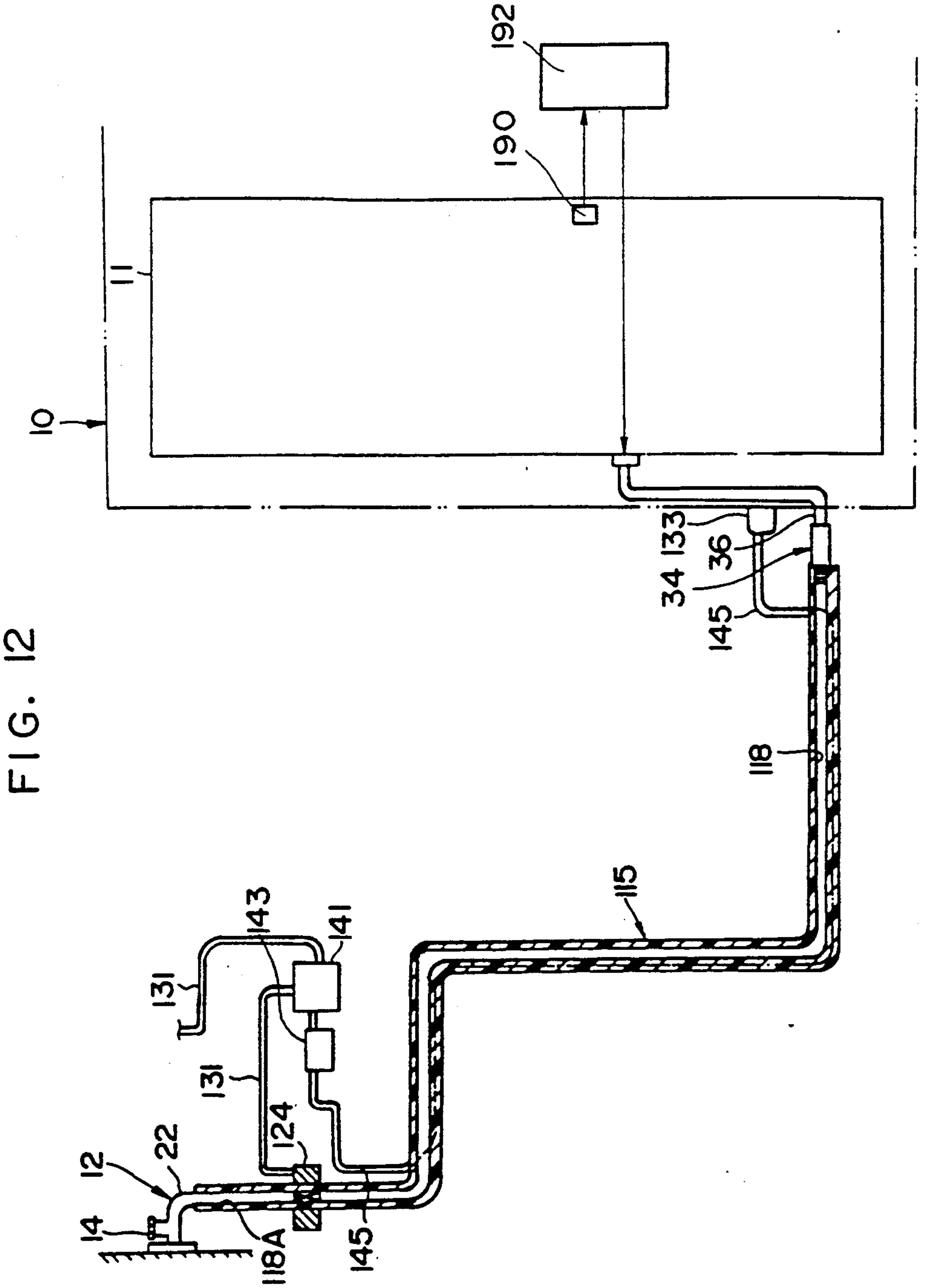
FIG. 12 is a schematic illustration of an eighth embodiment of the rinsing water supply system which includes a rinsing water contamination detecting apparatus in accordance with the present invention.
Figure 13:
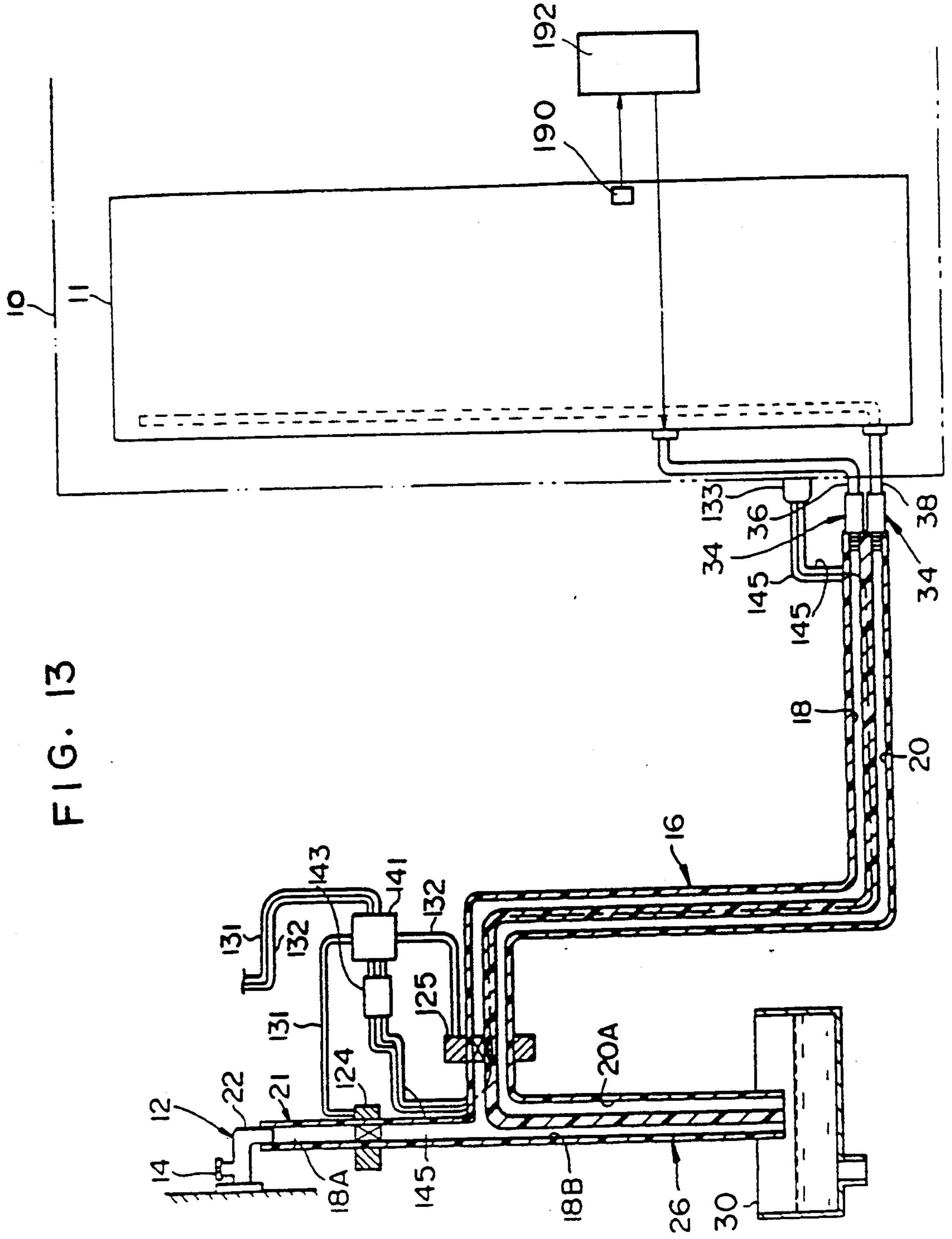
FIG. 13 is a schematic view of a pipe incorporated in the ninth embodiment taken along a plane perpendicular to the axis of the pipe, the embodiment includes a rinsing water contamination detecting apparatus.
Figure 14:
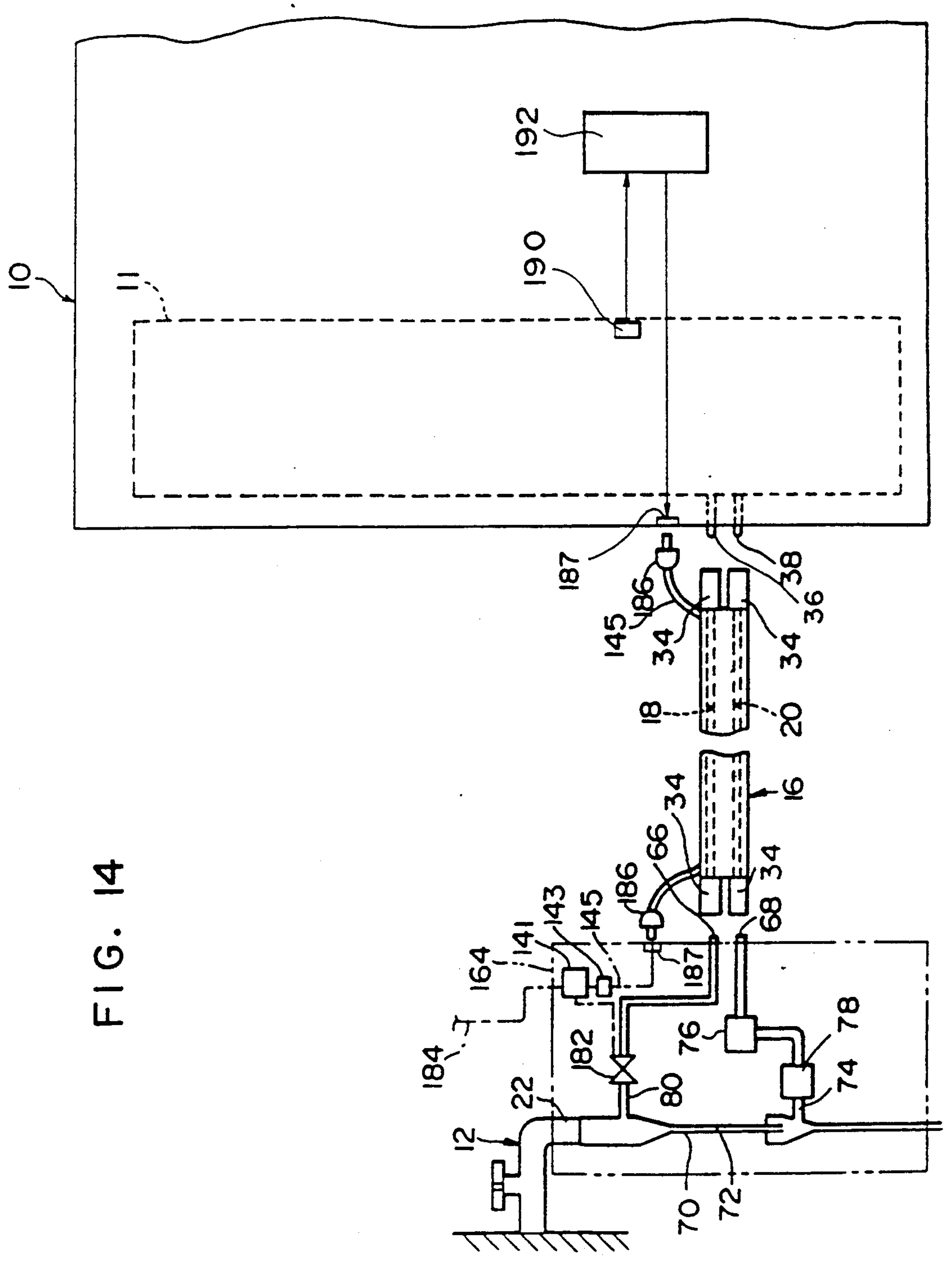
FIG. 14 is a schematic illustration of a tenth embodiment of the present invention which includes a rinsing water contamination detecting apparatus in which a draining means is constructed as a unit and is connected to a processor.

In FIG. 11, an additional sensor 188 is provided in the processing unit 11. The sensor 188 senses the arrival of the leading end and the passing of the trailing end of the photosensitive material at the inlet of the rinsing unit 11. Upon receipt of output from the sensor indicating the arrival of the leading end of the photosensitive material, the microcomputer operates to open the solenoid valve 82. Upon receipt of output from the sensor indicating that the trailing end of the photosensitive material has passed the inlet, the microcomputer operates to close the solenoid valve 82. The sensor 188 and the sensor 190 can be used alternatively to operate the supply/draining unit in this embodiment.

In the present invention, since the detecting apparatus accurately detects the degree of the contamination of the rinsing water, the amount of fresh rinsing water required to be supplied to the processing unit 11 so as to dilute the contaminated rinsing water to an acceptable level can also be accurately determined. Therefore, the degree or level of the contamination is constantly kept within acceptable limits by the supply of the minimum amount of fresh rinsing water required in response to the detected value representing the degree of the contamination of the rinsing water. As a result, this invention enables the amount of diluting water used to be minimized, contributing to a reduction in the cost of operating the system.

What is claimed is:

1. A rinsing water supply system for supplying rinsing water to a rinsing unit for rinsing a photosensitive material, and to water mixing means for diluting used contaminated water, said system comprising:
   - water supply passage means for supplying water from a water source external to said rinsing water supply system to said rinsing unit and to said water mixing means;
   - solenoid valve means for opening and closing said water supply passage means;
   - contaminated water draining passage means, disposed between said rinsing unit and said mixing means, for draining said contaminated water in said rinsing unit to said mixing means;
   - monitoring means for monitoring a level of contamination of said rinsing water independent of an amount of water in said rinsing unit, wherein said monitoring means comprises an electrical resistance meter for monitoring a level of electrical resistance in said rinsing water, and a microcomputer, responsive to an output of said electrical resistance meter, for operating said solenoid valve means; and
   - electric signal transmitting means embedded in said water supply passage means for transmitting signals from said monitoring means to said solenoid valve means to actuate said solenoid valve means in response to said level of contamination, such that, in response to said level of contamination of the water in said rinsing unit exceeding a predetermined level, said rinsing water is supplied to said rinsing unit, said used contaminated water is drained, and said rinsing water in said rinsing unit and said used contaminated water in said mixing water, respectively, are diluted.

2. A rinsing water supply system according to claim 1, wherein said water supply passage means includes a branch passage branching to said rinsing unit and mixing means in which the used contaminated water discharged from said rinsing unit through said contaminated water draining passage means is diluted by water introduced through said branch passage.

3. A rinsing water supply system according to claim 1, wherein said signal transmitting means includes electric lines connected to said solenoid valve means.

4. A rinsing water supply system according to claim 1, wherein said signal transmitting means includes signal lines embedded in said pipe in which said water supply passage means is formed.

5. A rinsing water supply system according to claim 1, wherein said signal transmitting means includes a cord.

6. A rinsing water supply system for supplying water from a water source to a rinsing unit of a developing apparatus for rinsing a photosensitive material and to water mixing means for diluting used contaminated water, said system comprising:
   - a pipe connected at its one end to said rinsing unit and having a first water supply passage for supplying water from a source external to said rinsing water supply system to said rinsing unit and a first draining passage, parallel to said first water supply passage, through which used contaminated water is discharged from said rinsing unit;
   - a water supply/draining unit connected between the other end of said pipe and said water source, said water supply/draining unit having a second water supply passage communicating with said first water supply passage, a branch passage branching from said second water supply passage so as to permit a portion of the water from said water source to shunt, mixing means communicating with said first draining passage for receiving the water from said branch passage and the used water from said first draining passage, and a solenoid valve for opening and closing said first water supply passage;

monitoring means for detecting the contamination level of said water in said rinsing unit independent of a level of said water level in said rinsing unit, wherein said monitoring means comprises an electrical resistance meter for monitoring a level of electrical resistance in said rinsing water, and a microcomputer, responsive to an output of said electrical resistance meter, for operating said solenoid valve; and electric signal transmitting means embedded in said pipe for transmitting signals for operating said solenoid valve to control the amount of flowing water through said first water supply passage in response to the contamination level detected by said monitoring means.

7. A rinsing water supply system according to claim 6, wherein said mixing means includes an ejector means formed in said branch passage and adapted to induce the used water through an induction port.

8. A rinsing water supply system according to claim 7, wherein said signal transmitting means includes electric line connected to said solenoid valve.

9. A rinsing water supply system according to claim 6, wherein said signal transmitting means includes signal lines embedded in said pipe.

10. A rinsing water supply system according to claim 6, wherein said signal transmitting means includes a cord in which signal lines are embedded, said cord being fixed to the outer peripheral surface of said pipe.

11. A rinsing water supply system for supplying rinsing water from a water source external to said rinsing water supply system to a rinsing unit of a developing apparatus for rinsing a photosensitive material and to water mixing means for diluting used contaminated water, said system comprising:

a pipe for having a water supply passage introducing water from said water source to said rinsing unit;

a solenoid valve for opening and closing said water supply passage;

monitoring means for detecting a contamination level of said rinsing water in said rinsing unit independent of a level of said rinsing water in said rinsing unit and providing an output accordingly, wherein said monitoring means comprises an electrical resistance meter for monitoring a level of electrical resistance in said rinsing water, and a microcomputer, responsive to an output of said electrical resistance meter, for operating said solenoid valve;

a branch pipe having a branch passage branching from said water supply passage;

electric lines embedded in said pipe for transmitting signals for operating said solenoid valve;

operating means, responsive to said output of said monitoring means, for actuating said solenoid valve to control the amount of flowing water through said first water supply passage in response to the contamination level detected by said monitoring means;

a draining passage formed in said pipe along said water supply passage and adapted for allowing the used contaminated water to be discharged from said rinsing unit therethrough; and mixing means for mixing water from said branch passage and the used contaminated water from said draining passage, such that, in response to said level of contamination of the water in said rinsing unit exceeding a predetermined level, said rinsing water is supplied to said rinsing unit, said used contaminated water is drained, and said rinsing water in said rinsing unit and said used contaminated water in said mixing water, respectively, are diluted.

12. A rinsing water supply system according to claim 11 wherein said draining passage has a portion which extends in said branch pipe along said branch passage.

13. A rinsing water supply unit according to claim 12, wherein said mixing means includes a butt which receives both the water from said branch passage and used water from said draining passage.

14. A rinsing water supply system for supplying rinsing water to a rinsing unit for rinsing a photosensitive material, and to water mixing means for diluting used contaminated water, said system comprising:

water supply passage means for supplying water from a water source external to said rinsing water supply system to said rinsing unit and to said water mixing means;

solenoid valve means for opening and closing said water supply passage means;

contaminated water draining passage means, disposed between said rinsing unit and said mixing means, for draining said contaminated water in said rinsing unit to said mixing means;

monitoring means for monitoring a level of contamination of said rinsing water independent of an amount of water in said rinsing unit, wherein said monitoring means comprises a pH meter for monitoring a pH level of said rinsing water, and a microcomputer, responsive to an output of said pH meter, for operating said solenoid valve means; and electric signal transmitting means embedded in said water supply passage means for transmitting signals from said monitoring means to said solenoid valve means to actuate said solenoid valve means in response to said level of contamination, such that, in response to said level of contamination of the water in said rinsing unit exceeding a predetermined level, said rinsing water is supplied to said rinsing unit, said used contaminated water is drained, and said rinsing water in said rinsing unit and said used contaminated water in said mixing water, respectively, are diluted.

15. A rinsing water supply system for supplying water from a water source to a rinsing unit of a developing apparatus for rinsing a photosensitive material and to water mixing means for diluting used contaminated water, said system comprising:

a pipe connected at its one end to said rinsing unit and having a first water supply passage for supplying water from a source external to said rinsing water supply system to said rinsing unit and a first draining passage, parallel to said first water supply passage, through which used contaminated water is discharged from said rinsing unit;

a water supply/draining unit connected between the other end of said pipe and said water source, said water supply/draining unit having a second water supply passage communicating with said first water supply passage, a branch passage branching from said second water supply passage so as to permit a portion of the water from said water source to shunt, mixing means communicating with said first draining passage for receiving the water from said branch passage and the used water from said first draining passage, and a solenoid valve for opening and closing said first water supply passage;

monitoring means for detecting the contamination level of said water in said rinsing unit independent of a level of said water level in said rinsing unit, wherein said monitoring means comprises a pH meter for monitoring a pH level of said rinsing water, and a microcomputer, responsive to an output of said pH meter, for operating said solenoid valve; and electric signal transmitting means embedded in said pipe for transmitting signals for operating said solenoid valve to control the amount of flowing water through said first water supply passage in response to the contamination level detected by said monitoring means.

16. A rinsing water supply system for supplying rinsing water from a water source external to said rinsing water supply system to a rinsing unit of a developing apparatus for rinsing a photosensitive material and to water mixing means for diluting used contaminated water, said system comprising:

a pipe for having a water supply passage introducing water from said water source to said rinsing unit;

a solenoid valve for opening and closing said water supply passage;

monitoring means for detecting a contamination level of said rinsing water in said rinsing unit independent of a level of said rinsing water in said rinsing unit and providing an output accordingly, wherein said monitoring means comprises a pH meter for monitoring a pH level of said rinsing water, and a microcomputer, responsive to an output of said pH meter, for operating said solenoid valve;

a branch pipe having a branch passage branching from said water supply passage;

electric lines embedded in said pipe for transmitting signals for operating said solenoid valve;

operating means, responsive to said output of said monitoring means, for actuating said solenoid valve to control the amount of flowing water through said first water supply passage in response to the contamination level detected by said monitoring means;

a draining passage formed in said pipe along said water supply passage and adapted for allowing the used contaminated water to be discharged from said rinsing unit therethrough; and mixing means for mixing water from said branch passage and the used contaminated water from said draining passage, such that, in response to said level of contamination of the water in said rinsing unit exceeding a predetermined level, said rinsing water is supplied to said rinsing unit, said used contaminated water is drained, and said rinsing water in said rinsing unit and said used contaminated water in said mixing water, respectively, are diluted.

* * * * *

UNITED STATES PATENT AND TRADEMARK OFFICE
CERTIFICATE OF CORRECTION

PATENT NO. : 5,089,840

DATED : February 18, 1992

INVENTOR(S) : Kiichiro SAKAMOTO ET AL.

It is certified that error appears in the above-identified patent and that said Letters Patent is hereby corrected as shown below:

On the title page: Item [73], delete "Inc." and insert --Ltd.--.

Signed and Sealed this

First Day of June, 1993

Attest:

Michael K. Kirk

MICHAEL K. KIRK

Attesting Officer

*Acting Commissioner of Patents and Trademarks*